(12) United States Patent
Ryu

(10) Patent No.: US 8,245,812 B2
(45) Date of Patent: Aug. 21, 2012

(54) DEVICE FOR CONTROLLING TORSIONAL STIFFNESS OF POWER STEERING SYSTEM

(75) Inventor: Sangwoock Ryu, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 464 days.

(21) Appl. No.: 12/556,386

(22) Filed: Sep. 9, 2009

(65) Prior Publication Data
US 2010/0059307 A1  Mar. 11, 2010

(30) Foreign Application Priority Data

Sep. 11, 2008 (KR) .......................... 10-2008-0089843

(51) Int. Cl.
*D62D 5/065* (2006.01)
(52) U.S. Cl. ........................................ 180/421; 180/427
(58) Field of Classification Search .................. 180/441, 180/422, 423, 426, 427; 74/388 PS; 267/186–188
See application file for complete search history.

(56) References Cited

U.S. PATENT DOCUMENTS

| | | | | | |
|---|---|---|---|---|---|
| 3,273,465 | A | * | 9/1966 | Eddy | 91/375 A |
| 4,996,905 | A | * | 3/1991 | Borror | 91/375 A |
| 5,875,953 | A | * | 3/1999 | Shioya | 228/112.1 |
| 5,878,780 | A | * | 3/1999 | Thomas | 137/625.23 |

FOREIGN PATENT DOCUMENTS

| | | | |
|---|---|---|---|
| JP | 55-164569 | A | 12/1980 |
| JP | 06-219295 | A | 8/1994 |
| JP | 11-59454 | A | 3/1999 |
| JP | 2004-17726 | A | 1/2004 |
| JP | 2005-262929 | A | 9/2005 |
| JP | 2007-38869 | A | 2/2007 |
| KR | 10-2006-0055650 | A | 5/2006 |
| KR | 10-0746671 | B1 | 8/2007 |
| SU | 1283454 | * | 1/1987 |

* cited by examiner

*Primary Examiner* — Anne Marie M Boehler
(74) *Attorney, Agent, or Firm* — Morgan, Lewis & Bockius LLP

(57) ABSTRACT

A device for controlling torsional stiffness of a power steering system, may include a variable torsion bar, an input shaft that is connected with a steering wheel, a pinion shaft equipped with a pinion gear engaged with a rack bar of a steering gear box, wherein the input shaft and the pinion shaft are combined each other to form a guide hole and slidably receive the variable torsion bar therein, and an actuating apparatus that moves the variable torsion bar toward the input shaft or the pinion shaft along a longitudinal axis of the input shaft and the pinion shaft according to a hydraulic pressure so as to change a size of a cross-section of the device.

11 Claims, 4 Drawing Sheets

DEVICE FOR CONTROLLING TORSIONAL STIFFNESS OF POWER STEERING SYSTEM

CROSS-REFERENCE TO RELATED APPLICATIONS

The present application Claims priority to Korean Application Serial Number 10-2008-0089843, filed on Sep. 11, 2008, the entire contents of which are incorporated herein for all purposes by this reference.

BACKGROUND OF THE INVENTION

1. Field of the Invention

The present invention relates to a device for controlling torsional stiffness of a power steering system, particularly a device for controlling torsional stiffness of a power steering system that improve stability in operation of a steering wheel by changing stiffness of a torsion bar according to driving conditions of a vehicle.

2. Description of Related Art

In the related art, a power steering system that supplements operational force that is applied to the steering wheel by a driver has been widely used for a steering system of vehicles and a hydraulic power steering system that supplements operational force that is applied to the steering wheel by generating hydraulic pressure has been generally used in the power steering system.

The hydraulic power steering system includes, a power unit having a valve unit composed of a hydraulic pump generating hydraulic pressure, which is power source, a pressure control valve, and a flow control valve, an actuating unit using an actuating cylinder to generates auxiliary steering force by converting the hydraulic pressure generated by the hydraulic pump into mechanical force, and a control unit controlling the operational direction and condition of the actuating cylinder by opening/closing a flow channel connected to the actuating unit and changing the flow channel by operation of the steering wheel.

The control unit includes, an input shaft that is connected with the steering wheel and rotates integrally with the steering wheel, a pinion gear that is engaged with a rack bar of a steering gear box to move the rack bar to the left and right, a torsion bar that connects the input shaft with the pinion gear such that they integrally rotate, and a control valve that appropriately changes the flow channel to supply the hydraulic pressure supplied from the hydraulic pump to the actuating cylinder by the operation of steering wheel.

As a driver operates the steering wheel, the input shaft is rotated by the operation of the steering wheel and the rotation of the input shaft is transmitted to the pinion gear, such that the pinion gear moves the rack bar while rotating and the wheels turn. In this operation, the control valve is changed in the amount of opening/closing by the relative positional difference between the input shaft and the pinion gear and the amount of flow through the control valve is controlled. Accordingly, hydraulic pressure is supplied to the actuating cylinder and supplements the operational force applied to the steering wheel by the driver.

The operational characteristics of the control valve are changed by the stiffness of the torsion bar in the power steering system in the related art as described above. Therefore, when the stiffness of the torsion bar is small, the relative positional difference between the input shaft and the pinion shaft becomes large, even if the driver applies small force to operate the steering wheel, such that the flow rate and hydraulic pressure through the control valve increases and the auxiliary force for the steering wheel transmitted through the actuating cylinder increases, which decreases handing force for the steering wheel. On the contrary, when the stiffness of the torsion bar is large, the relative positional difference between the input shaft and the pinion shaft is small, even if the driver applies large force to operate the steering wheel, the flow rate and hydraulic pressure through the control valve decreases and the auxiliary force for the steering wheel transmitted through the actuating cylinder decreases, which increases handling force for the steering wheel.

However, in the power steering system in the related art as described above, because the stiffness of the torsion bar is fixed to a specific value in design, it is limited to achieve desired characteristics of hydraulic torque.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a device for controlling torsional stiffness of a power steering system that can improve steering stability of a vehicle by setting small the stiffness of a torsion bar to reduce the handling force for the steering wheel when driving the vehicle at a low velocity or parking it, and setting large the stiffness of the torsion bar when driving the vehicle at a high velocity, that makes it possible to easily tune handling characteristics of the steering wheel, and that improves the commercial value of the vehicle by easily changing the handling force of the steering wheel corresponding to taste of consumers.

In an aspect of the present invention, the device for controlling torsional stiffness of a power steering system, may include a variable torsion bar, an input shaft that is connected with a steering wheel, a pinion shaft equipped with a pinion gear engaged with a rack bar of a steering gear box, wherein the input shaft and the pinion shaft are combined each other to form a guide hole and slidably receive the variable torsion bar therein, and an actuating apparatus that moves the variable torsion bar toward the input shaft or the pinion shaft along a longitudinal axis of the input shaft and the pinion shaft according to a hydraulic pressure so as to change a size of a cross-section of the device, The actuating apparatus may include a support spring disposed in a lower portion of the guide hole and elastically supporting a lower portion of the variable torsion bar, and a hydraulic chamber formed on an upper portion of the guide hole and receive the hydraulic pressure to move the variable torsion bar.

The hydraulic pressure may be supplied to the hydraulic chamber from a hydraulic pump through a flow channel formed in the input shaft.

A valve body may be fitted around outer circumferences of the input shaft and the pinion shaft and includes a first inlet to communicate the flow channel with the outside.

The input shaft may include a second inlet communicating a lower portion of the hydraulic chamber with the first inlet of the valve body and selectively closed by the variable torsion bar.

The variable torsion bar may include a diameter-variable portion and at least a rectangular flange is formed at the diameter-variable portion in a longitudinal direction thereof and the flange is movably inserted in a seating groove formed to the guide hole such that the second inlet is selectively closed by the flange, wherein a diameter of the diameter-variable portion is longitudinally decreased to form a cone shape.

The actuating apparatus further may include a flow chamber dented from the outer circumference of the input shaft and covered by an inner surface of the valve body and the first inlet, the second inlet, and the flow channel communicate with the flow chamber.

The variable torsion bar may have a diameter-variable portion of which a diameter is longitudinally decreased to form a cone shape, wherein at least a rectangular flange is formed at the diameter-variable portion in a longitudinal direction thereof and the flange is movably inserted in a seating groove formed to the guide hole and wherein longitudinal length of the flange is shorter than longitudinal length of the diameter-variable portion.

In various aspects of the present invention, the hydraulic pressure exerted on the torsion bar is small when the vehicle is driven at a high velocity or parked, such that the stiffness of the torsion bar connecting the input shaft with the pinion shaft decreases and the steering wheel can be turned by small force, whereas the hydraulic pressure exerted on the torsion bar increases when the vehicle is driven at a high velocity, such that the stiffness of the torsion bar connecting the input shaft with the pinion shaft increases and handling force is more required to turn the steering wheel. As a result, stability of the vehicle that is in travel is improved. Further, by appropriately adjusting the diameter of the variable bar, not only it is easy to tune the performance of the power steering system, but design-freedom is improved. In addition, since the handling force for the steering wheel can be adjusted according to taste of consumers, the commercial value of the vehicle is improved.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
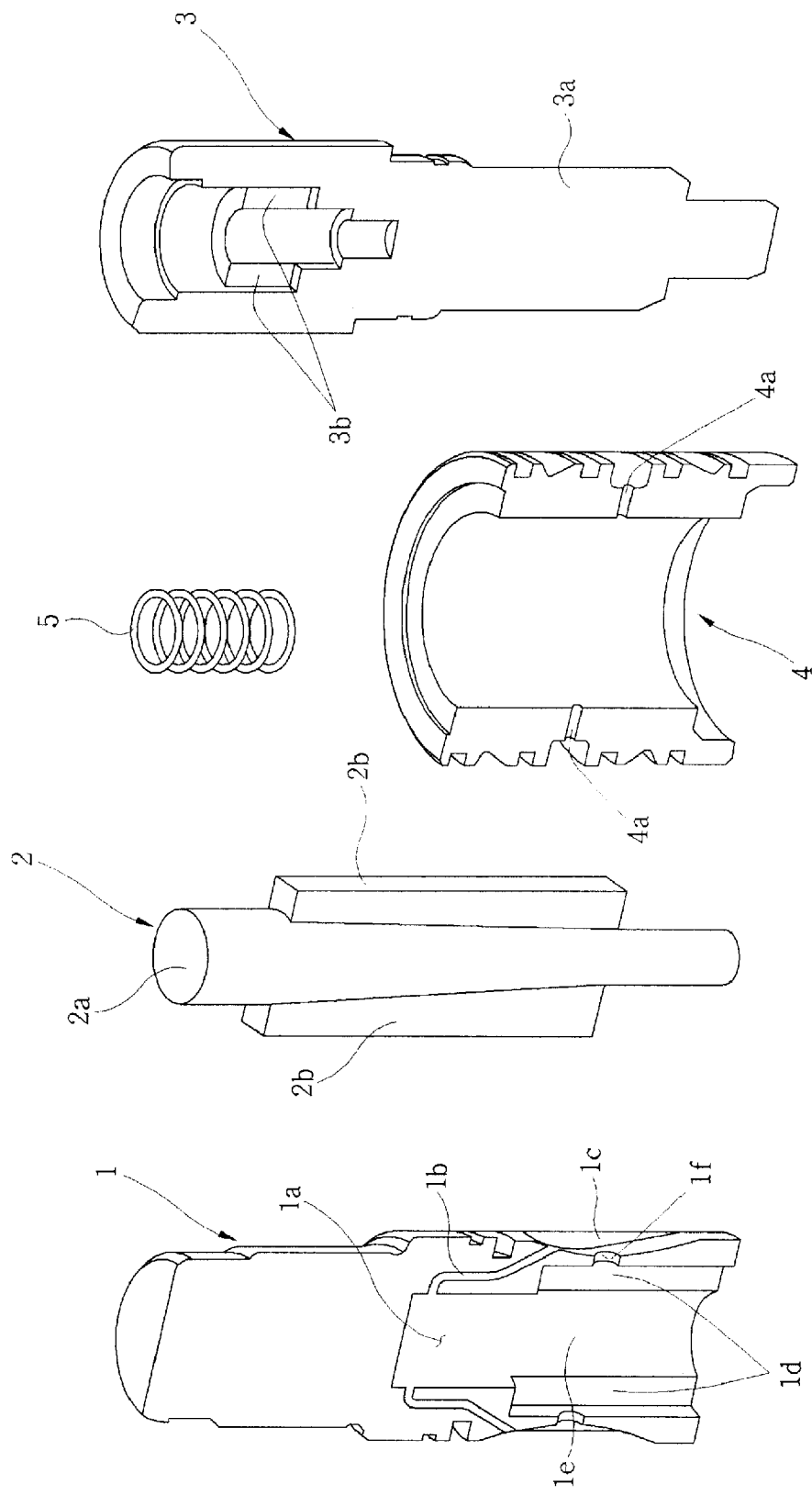
FIG. 1 is an exploded perspective view of a device for controlling torsional stiffness of a power steering system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
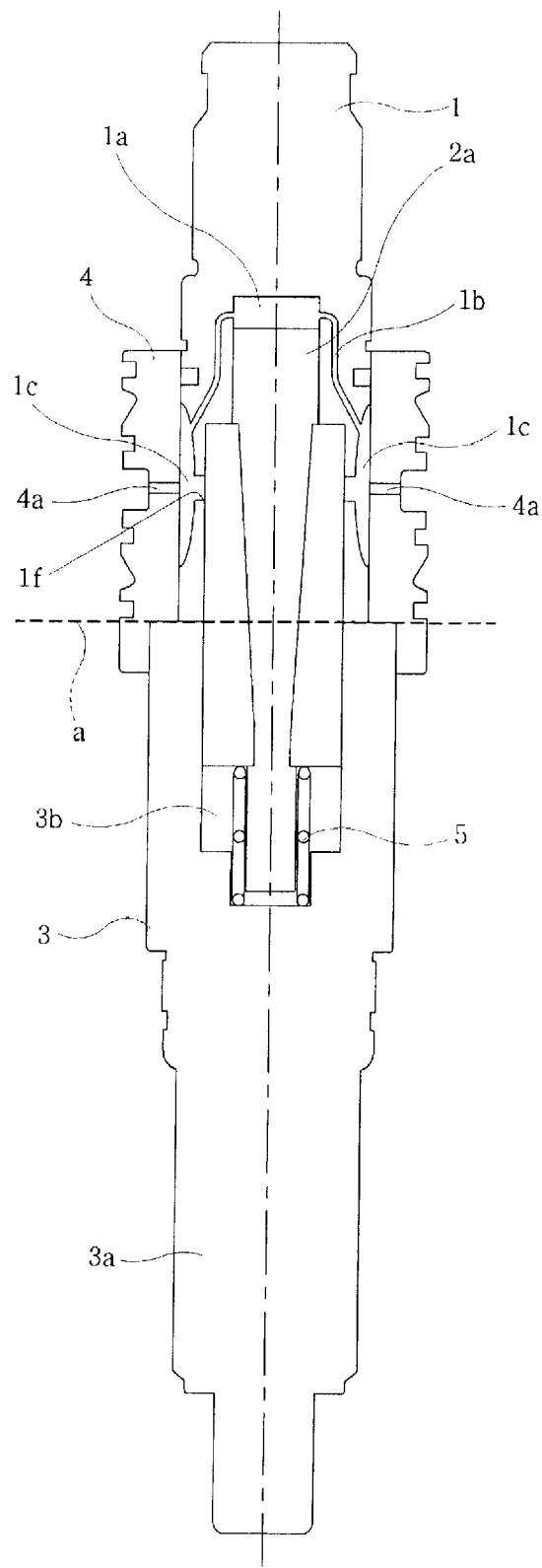
FIG. 2 is a cross-sectional assembly view of the device for controlling torsional stiffness of a power steering system according to an exemplary embodiment of the present invention.

FIGS. 1 and 2 respectively shows an exploded perspective view and a cross-sectional assembly view of a device for controlling torsional stiffness of a power steering system according to an exemplary embodiment of the present invention, in which an input shaft 1, which is connected with a steering wheel to be integrally rotated by steering force applied to the steering wheel, is rotatably connected integrally with a pinion shaft 3 through a variable torsion bar 2 according to an exemplary embodiment of the present invention, and a pinion gear 3a is formed at the lower end of pinion shaft 3 and engaged with a rack bar of a steering gear box.

Therefore, as the steering wheel is turned, the input shaft rotates in the same direction and the rotational motion of the input shaft is transmitted to the pinion gear through the variable torsion bar, such that the pinion shaft rotates. Further, the rotational motion of the pinion shaft is transmitted to the rack bar through the pinion gear, such that the rack bar moves left or right in the steering gear box and the wheels of a vehicle are turned.

A valve body 4 is fitted around input shaft 1 and a plurality of inlets 4a through which oil flows inside are formed through the outer side and the inner side of valve body 4.

A guide hole 1e is formed in the input shaft 1 and the pinion shaft 3 and the variable torsion bar 2 is inserted thereto. A seating groove 1d is formed in input shaft 1 and a hydraulic chamber 1a that presses torsion bar 2 using hydraulic pressure when variable torsion bar 2 is seated movably up/down in the seating groove 1d, is formed at the upper end portion of variable torsion bar 2. Further, a flow channel 1b is formed from hydraulic chamber 1a to the outer circumference of the input shaft to supply oil to hydraulic chamber 1a and a flow chamber 1c fluidly connected with inlet 4a of input shaft 1 is a groove recessed inward from the outer circumference of input shaft 1, as shown in FIG. 1, and located at the end portion of flow channel 1b. The flow chamber 1c communicates with a lower portion of the hydraulic chamber 1a via an oil inlet 1f formed in the input shaft 1.

Torsion bar 2 has a diameter-variable bar 2a of which the diameter gradually decreases toward the lower portion from the upper portion and left and right flanges 2b integrally formed with diameter-variable bar 2a and having rectangular shapes. Both flanges 2b are shorter than the diameter-variable bar in the longitudinal direction thereof.

A seating groove 3b where diameter-variable bar 2 is seated is formed in pinion shaft 3, such that the flanges of torsion bar 2 are seated in seating groove 3b of the pinion shaft and seating groove 1d of the input shaft to be capable of moving up/down along the seating grooves. Further, the lower end of the torsion bar is elastically supported by a support spring 5 inside the pinion shaft.

When variable torsion bar 2 is inserted in input shaft 1 and pinion shaft 3 such that the input shaft and pinion shaft is integrally combined with each other, torsion of the torsion bar frequently occurs at the interface (a) of the upper end portion surface of pinion shaft 3 and the lower end surface of valve body 4.

Figure 3:
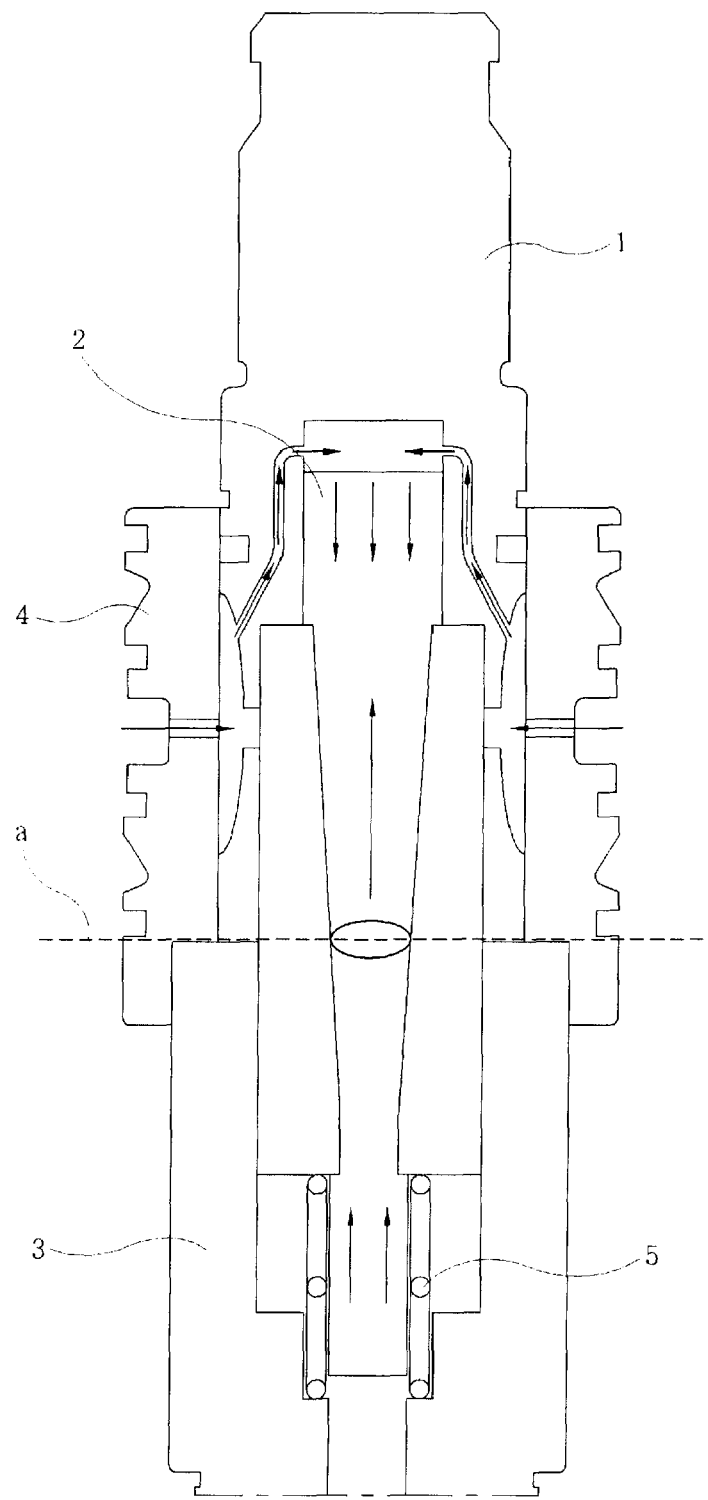
FIGS. 3 and 4 are views illustrating the operation of the device for controlling torsional stiffness of a power steering system according to an exemplary embodiment of the present invention.

FIG. 3 illustrates the operation of the device for controlling torsional stiffness according to an exemplary embodiment of the present invention when a vehicle is driven at a low velocity or parked. Relatively small flow rate and hydraulic pressure that are outputted from the hydraulic pump, which is actuated by rotational power outputted from the engine when a vehicle is driven at a low velocity or parked, are transmitted into hydraulic chamber 1a through inlet 4a of the valve body and flow channel 1b of input shaft 1. The transmitted flow rate and hydraulic pressure acts on the upper end portion of torsion bar to press the torsion bar, such that the torsion bar moves toward the pinion shaft along the seating grooves. However, since the lower end of the torsion bar is supported by the support spring, the torsion bar moves until the hydraulic pressure exerted on the upper portion of the torsion bar and the elastic force of the spring exerted on the lower portion becomes in equilibrium. Thereafter, as the force by the hydraulic pressure becomes smaller than the elastic force of the support spring, the torsion bar moves toward input shaft 1, such that the torsional stiffness of the torsion bar decreases because the diameter of diameter-variable bar 2a relatively decreases at the interface.

Therefore, since the stiffness of the torsion bar is small when the vehicle is driven at a low velocity or parked, the steering wheel can be turned by small force.

Figure 4:
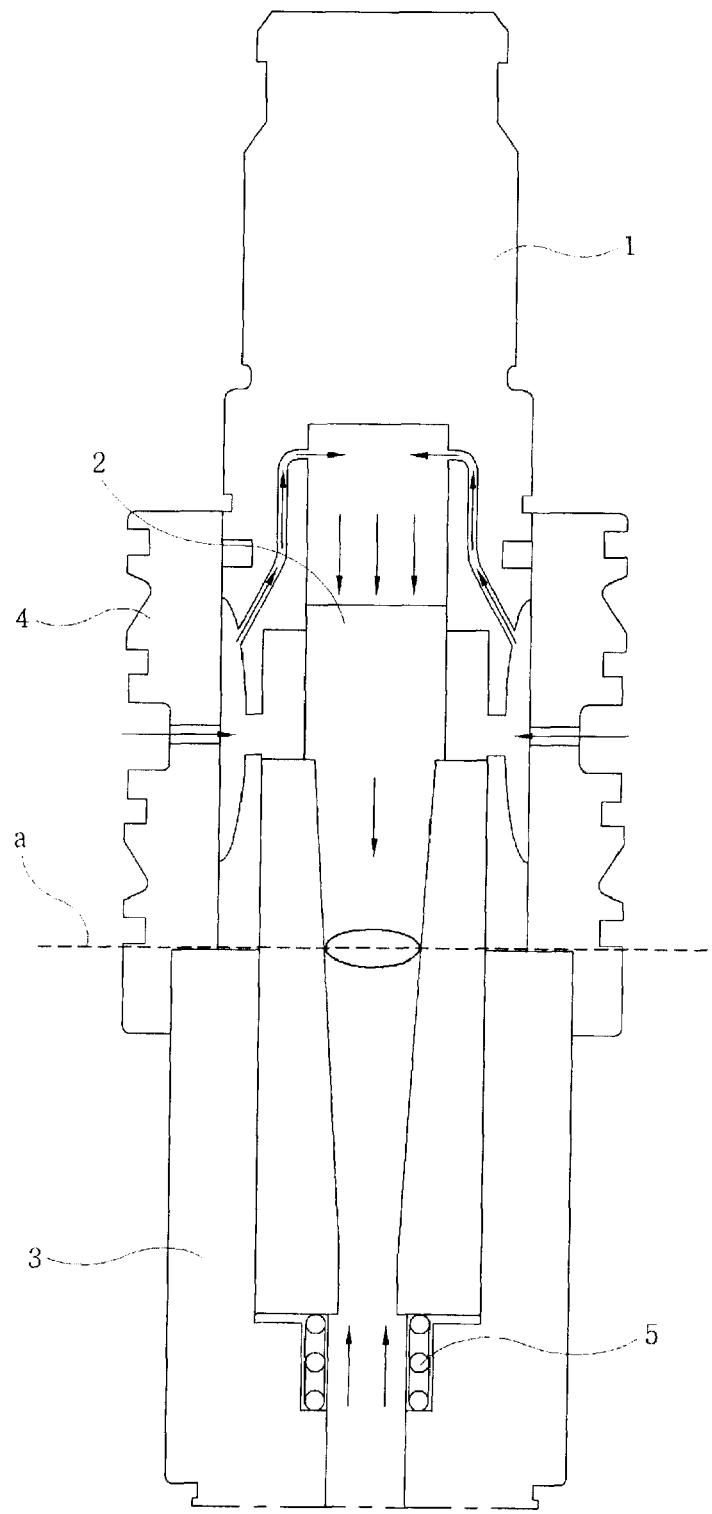

On the other hand, when the vehicle is driven at a high velocity, as shown in FIG. 4, the flow rate and hydraulic pressure outputted from the hydraulic pump increase and the hydraulic pressure exerted in the hydraulic chamber correspondingly increases, such that torsion bar 2 moves toward pinion shaft 3. Accordingly, the diameter of torsion bar 2 increases at the interface (a) as compared with FIG. 3, such that the stiffness of the torsion bar increases and handling force is more required to turn the steering wheel.

For convenience in explanation and accurate definition in the appended claims, the terms "upper", "lower", "outer", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for controlling torsional stiffness of a power steering system, comprising:
   a variable torsion bar;
   an input shaft that is connected with a steering wheel;
   a pinion shaft equipped with a pinion gear engaged with a rack bar of a steering gear box, wherein the input shaft and the pinion shaft are combined with each other to form a guide hole and slidably receive the variable torsion bar therein; and
   an actuating apparatus that moves the variable torsion bar toward the input shaft or the pinion shaft along a longitudinal axis of the input shaft and the pinion shaft according to a hydraulic pressure so as to change a size of a cross-section of the torsion bar at an interface between the pinion shaft and a valve body.

2. The device for controlling torsional stiffness of a power steering system as defined in claim 1, wherein the actuating apparatus includes:
   a support spring disposed in a lower portion of the guide hole and elastically supporting a lower portion of the variable torsion bar; and
   a hydraulic chamber formed on an upper portion of the guide hole and receive the hydraulic pressure to move the variable torsion bar.

3. The device for controlling torsional stiffness of a power steering system as defined in claim 2, wherein the hydraulic pressure is supplied to the hydraulic chamber from a hydraulic pump through a flow channel formed in the input shaft.

4. The device for controlling torsional stiffness of a power steering system as defined in claim 3, wherein the valve body is fitted around outer circumferences of the input shaft and the pinion shaft and includes a first inlet to communicate the flow channel with the outside.

5. The device for controlling torsional stiffness of a power steering system as defined in claim 4, wherein the input shaft includes a second inlet communicating a lower portion of the hydraulic chamber with the first inlet of the valve body and selectively closed by the variable torsion bar.

6. The device for controlling torsional stiffness of a power steering system as defined in claim 5, wherein the variable torsion bar includes a diameter-variable portion and at least a rectangular flange is formed at the diameter-variable portion in a longitudinal direction thereof and the flange is movably inserted in a seating groove formed to the guide hole such that the second inlet is selectively closed by the flange.

7. The device for controlling torsional stiffness of a power steering system as defined in claim 6, wherein a diameter of the diameter-variable portion is longitudinally decreased to form a cone shape.

8. The device for controlling torsional stiffness of a power steering system as defined in claim 6, wherein the actuating apparatus further includes a flow chamber recessed from the outer circumference of the input shaft and covered by an inner surface of the valve body and the first inlet, the second inlet, and the flow channel communicate with the flow chamber.

9. The device for controlling torsional stiffness of a power steering system as defined in claim 1, wherein the variable torsion bar has a diameter-variable portion of which a diameter is longitudinally decreased to form a cone shape.

10. The device for controlling torsional stiffness of a power steering system as defined in claim 9, wherein at least a rectangular flange is formed at the diameter-variable portion in a longitudinal direction thereof and the flange is movably inserted in a seating groove formed to the guide hole.

11. The device for controlling torsional stiffness of a power steering system as defined in claim 10, wherein longitudinal length of the flange is shorter than longitudinal length of the diameter-variable portion.

* * * * *